United States Patent
Dodds et al.

(10) Patent No.: US 11,806,894 B2
(45) Date of Patent: Nov. 7, 2023

(54) METHOD AND APPARATUS FOR IMPROVING CORE MANUFACTURING FOR GAS TURBINE COMPONENTS

(71) Applicant: Chromalloy Gas Turbine LLC, Palm Beach Gardens, FL (US)

(72) Inventors: Gerald Clement Dodds, Lutz, FL (US); Zachary Oras, Riverview, FL (US); Thomas Molkentin, Lithia, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 822 days.

(21) Appl. No.: 16/229,425

(22) Filed: Dec. 21, 2018

(65) Prior Publication Data

US 2020/0198180 A1   Jun. 25, 2020

(51) Int. Cl.
  *B28B 7/34* (2006.01)
  *B28B 1/24* (2006.01)
  *B33Y 80/00* (2015.01)

(52) U.S. Cl.
  CPC .............. *B28B 7/34* (2013.01); *B28B 1/24* (2013.01); *B28B 7/342* (2013.01); *B28B 7/348* (2013.01); *B33Y 80/00* (2014.12); *F05D 2230/21* (2013.01)

(58) Field of Classification Search
  CPC .. B28B 7/34; B28B 1/24; B28B 7/348; B28B 7/342; B28B 7/346; B28B 1/001; B29C 2045/378; B29C 33/301; B29C 33/448; B29C 33/52; B29C 45/4457; B29C 33/306; F05D 2230/21; F05D 5/187; B33Y 80/00
  See application file for complete search history.

(56) References Cited

U.S. PATENT DOCUMENTS

| | | | | |
|---|---|---|---|---|
| 3,871,611 A | * | 3/1975 | Taketa | B29C 33/306 249/102 |
| 4,321,010 A | * | 3/1982 | Wilkinson | F01D 5/284 416/96 A |
| 6,782,940 B2 | * | 8/2004 | Billiet | B22C 9/065 264/220 |

(Continued)

FOREIGN PATENT DOCUMENTS

| | | | | |
|---|---|---|---|---|
| CN | 108819049 A | * | 11/2018 | ........... B29C 33/306 |
| WO | WO-2019132912 A1 | * | 7/2019 | ........... B29C 33/306 |

OTHER PUBLICATIONS

Translation of CN-108819049-A (Year: 2018).*
Extended European Search Report, dated Aug. 22, 2022, issued in European Application No. 19898370.2, 12 pages.

*Primary Examiner* — Xiao S Zhao
*Assistant Examiner* — John J DeRusso
(74) *Attorney, Agent, or Firm* — AVEK IP, LLC

(57) ABSTRACT

An apparatus and method for producing a core for use in casting a gas turbine component is provided. The apparatus comprises a system having a cavity block with an upper portion, a lower portion, and a recessed cavity in each of the upper portion and the lower portion. Positioned within the cavity block is an adapter insert, and within the adapter insert is positioned a core die insert, where the core die insert is fabricated from a sacrificial material and has a hollow internal profile corresponding to an external surface of a core. A ceramic-based material is supplied to the core die insert where it solidifies. The core die insert is placed into a water-based solution and the core die insert is removed from around the core.

20 Claims, 8 Drawing Sheets

(56) References Cited

U.S. PATENT DOCUMENTS

| | | | | |
|---|---|---|---|---|
| 7,413,001 | B2* | 8/2008 | Wang | B22C 9/10 |
| | | | | 164/369 |
| 9,089,999 | B2* | 7/2015 | Dean | B29D 35/122 |
| 11,048,829 | B2* | 6/2021 | Stump | G06F 30/00 |
| 2001/0008323 | A1* | 7/2001 | Reed | B29C 33/0061 |
| | | | | 264/267 |
| 2002/0187065 | A1* | 12/2002 | Amaya | B22F 3/225 |
| | | | | 419/8 |
| 2012/0291983 | A1* | 11/2012 | Graham | B22D 15/02 |
| | | | | 164/516 |
| 2013/0220571 | A1 | 8/2013 | Mueller et al. | |
| 2015/0096713 | A1* | 4/2015 | Marcin | B22D 17/2209 |
| | | | | 164/520 |
| 2019/0015893 | A1* | 1/2019 | Breneman | B22C 1/14 |
| 2019/0329488 | A1* | 10/2019 | Ravich | B29C 35/0805 |
| 2021/0276077 | A1* | 9/2021 | Hearon | B28B 1/24 |

* cited by examiner

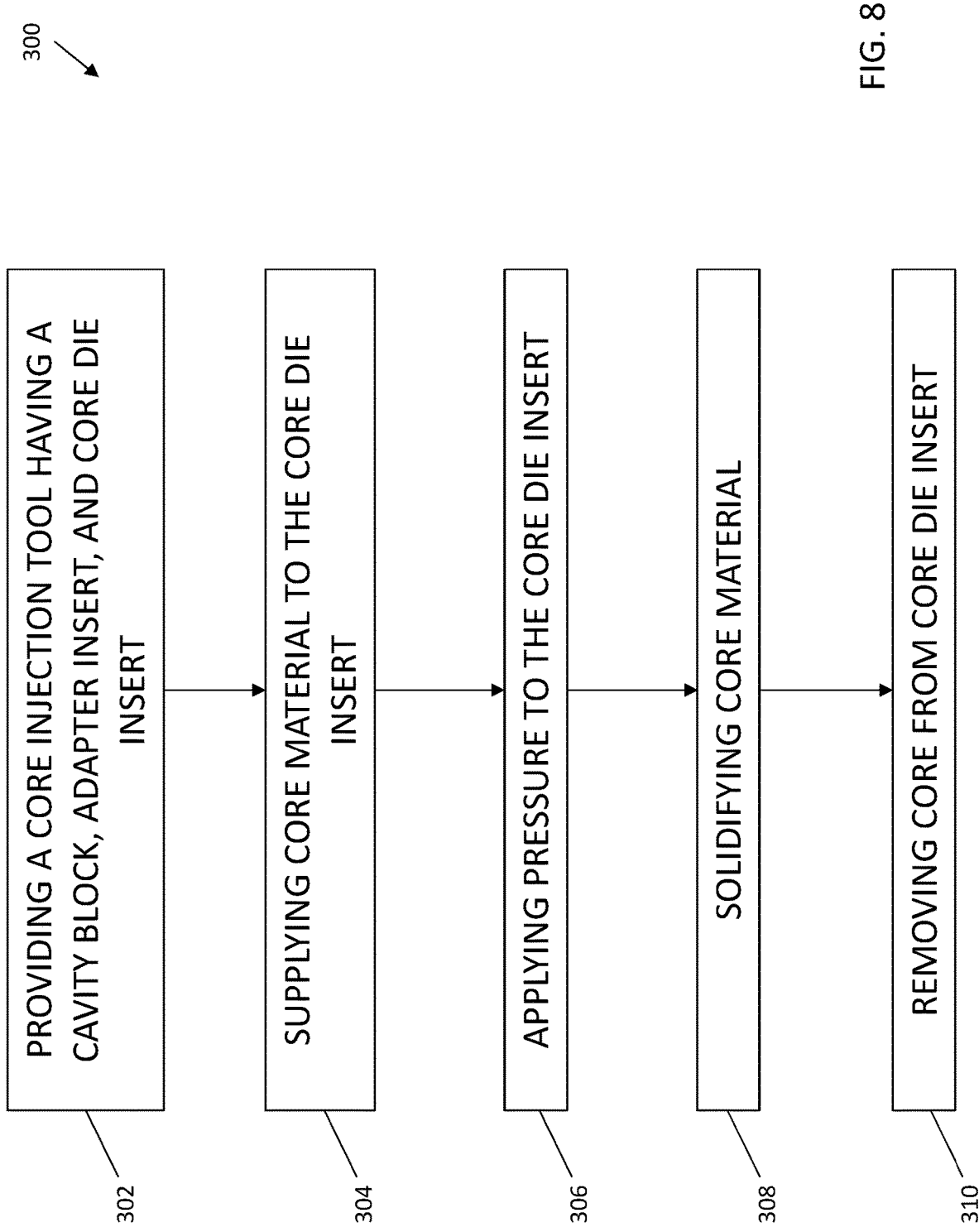

METHOD AND APPARATUS FOR IMPROVING CORE MANUFACTURING FOR GAS TURBINE COMPONENTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This present disclosure relates generally to a tool and process for producing a ceramic-based core used in the production of a cooled turbine component. More specifically, embodiments of the present disclosure relate to the use of a sacrificial material in the production of a core injection tool.

BACKGROUND OF THE DISCLOSURE

A gas turbine engine typically comprises a multi-stage compressor coupled to a multi-stage turbine via an axial shaft. Air enters the gas turbine engine through the compressor where its temperature and pressure are increased as it passes through subsequent stages of the compressor. The compressed air is then directed to one or more combustors where it is mixed with a fuel source to create a combustible mixture. This mixture is ignited in the combustors to create a flow of hot combustion gases. These gases are directed into the turbine causing the turbine to rotate, thereby driving the compressor. The output of the gas turbine engine can be mechanical thrust via exhaust from the turbine or shaft power from the rotation of an axial shaft, where the axial shaft can drive a generator to produce electricity.

The compressor and turbine each comprise a plurality of rotating blades and stationary vanes having an airfoil extending into the flow of compressed air or flow of hot combustion gases. Each blade or vane has a particular set of design criteria which must be met in order to provide the necessary work to the passing flow through the compressor and the turbine. However, due to the severe nature of the operating environment, especially in the turbine, it is often necessary to cool these blades and vanes.

Gas turbine components often utilize complex internal cooling passageways in order to maximize the efficiency of cooling fluid passing therethrough. These complex cooling passageways are often created in a casting by utilizing a ceramic core, around which the metal forming the walls of the casting are poured. The ceramic core is subsequently dissolved out of the casting, leaving behind the passageways through which cooling fluid flows. However, manufacturing cores needed to create these complex cooling passageways in a cast component requires expensive and detailed tooling due to core geometry and other cooling enhancements located in the surface of the core.

BRIEF SUMMARY OF THE DISCLOSURE

The present disclosure includes a method and apparatus for improving the production of cores used in casting complex, advanced gas turbine components. The present disclosure provides multiple improvements in airfoil casting techniques by way of providing improved core production techniques. The present disclosure also provides a way of testing core shapes and cooling features prior to committing to permanent and expensive tooling.

In an embodiment of the present disclosure, a system for producing a core for use in casting a gas turbine component is disclosed. The system comprises a cavity block having an upper portion and a lower portion and a recessed cavity in each of the upper portion and the lower portion where the upper portion is removably secured to the lower portion. Positioned within the cavity block is an adapter insert, the adapter insert having a first portion and a second portion. A core die insert is located within the adapter insert, where the core die insert is fabricated from a sacrificial material and has a hollow internal profile corresponding to the shape of a core for the gas turbine component.

In an alternate embodiment of the present disclosure, a method of producing a core for use in casting a gas turbine component is provided. The method comprises providing a core injection tooling having a cavity block with an upper portion and a lower portion and a recessed cavity in each of the upper portion and the lower portion, an adapter insert having a first portion and a second portion, the adapter insert sized to fit within the recessed cavities in the cavity block, and a core die insert positioned within the adapter insert. The core die insert, which can be fabricated from an additive manufacturing process, is comprised of a sacrificial material. A ceramic-based material is directed into the core die insert and pressure is applied to the core die insert so that the ceramic-based core material will fill the core die insert and solidify, forming the core. The core die insert is removed from around the solidified core by placing the core die insert and solidified core into a water-based bath.

In a further embodiment of the present disclosure, a core die insert having an internal cavity, with an internal surface corresponding to an external profile of a core used for casting a gas turbine component, is provided. The core die insert is fabricated from a sacrificial material and has an inlet at one end thereof and is in communication with the internal cavity.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein:

FIG. 8 is a chart outlining the steps for producing a core in accordance with an embodiment of the present disclosure.

DETAILED DESCRIPTION OF THE DISCLOSURE

The present disclosure is intended for use in a gas turbine engine, such as a gas turbine used for aircraft engines and/or power generation. As such, the present disclosure is capable of being used in a variety of turbine operating environments, regardless of the manufacturer.

As those skilled in the art will readily appreciate, a gas turbine engine is circumferentially disposed about an engine centerline, or axial centerline axis. The engine includes a compressor, a combustion section and a turbine with the turbine coupled to the compressor via an engine shaft. As is well known in the art, air compressed in the compressor is mixed with fuel which is burned in the combustion section and expanded in turbine. The air compressed in the compressor and the fuel mixture expanded in the turbine can both be referred to as a "hot gas stream flow." The turbine includes rotors that, in response to the fluid expansion, rotate, thereby driving the compressor. The turbine comprises alternating rows of rotary turbine blades, and static airfoils, often referred to as vanes.

Due to the temperatures of the hot gas stream flow, which can be well over 2000 deg. F., it is necessary to cool the turbine blades and/or vanes, as operating temperatures are often equal to or greater than the material capability of the turbine components. However, in order to effectively cool critical surfaces of the turbine components, often times a complex internal cooling cavity is required. Producing such a complex internal cooling structure, especially with smaller aerospace components, is extremely difficult to manufacture given the often small size of the components and cooling features. At the same time, it is also desirable to use any cooling air efficiently as cooling air for turbine components is removed from the working process of the engine, thereby lowering overall engine efficiency.

One way to cool the turbine component is to produce a hollow cavity within the airfoil portion of the blade or vane, where the hollow cavity includes internal passageways for directing the cooling fluid through the component as well as surface features to enhance its cooling effectiveness. Due to the geometric constraints of the components, it is often necessary to cast these features into the gas turbine component, as it is not always possible to machine many of the complex cooling features into the turbine component.

Figure 1:
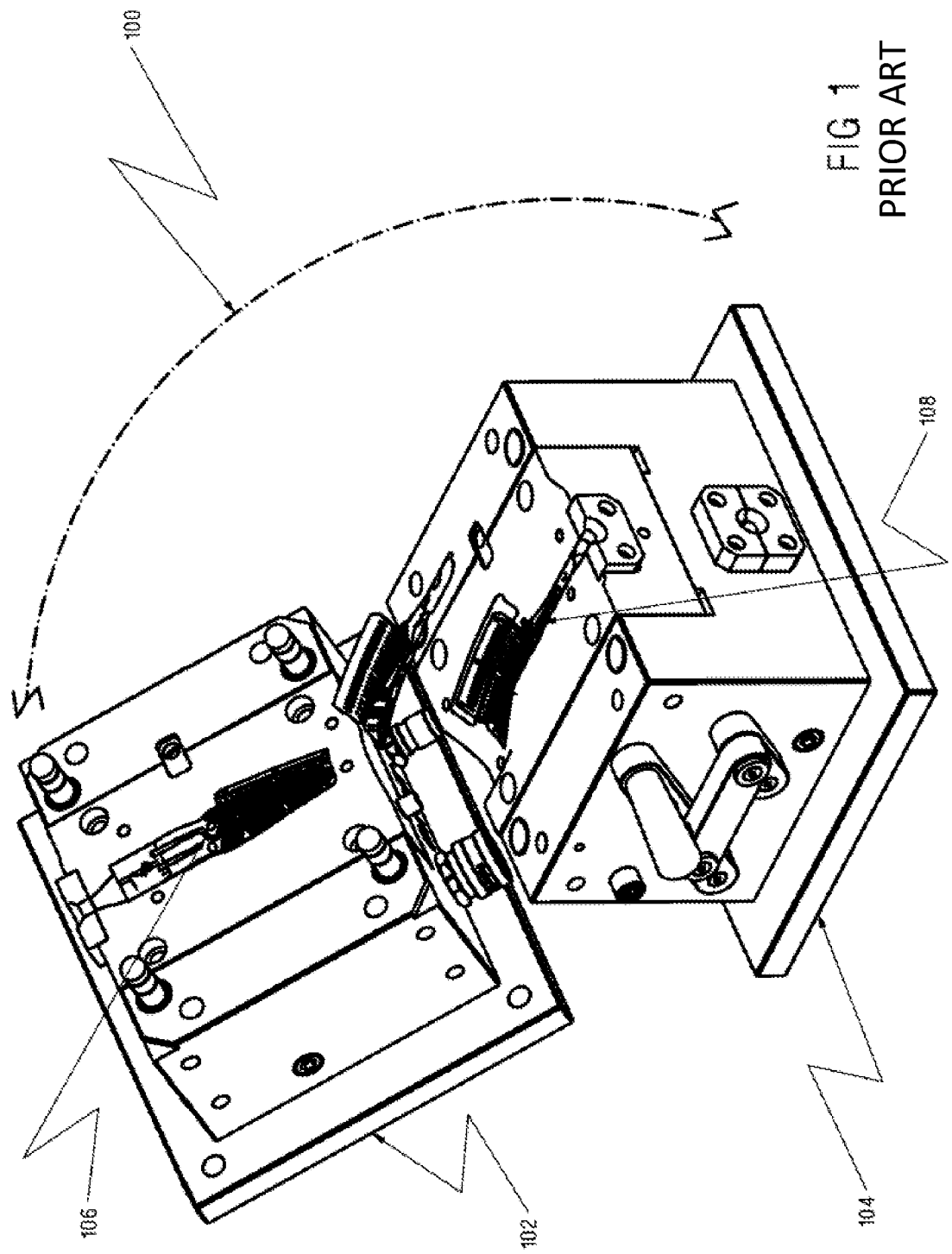
FIG. 1 is a perspective view of a core die tool in accordance with the prior art.

Referring initially to FIG. 1, a core die tool 100 for injecting a ceramic core in accordance with the prior art is shown in perspective view. As can be seen from FIG. 1, the core die tool 100 includes a top half 102 and bottom half 104, each having a portion of the core profile 106 and 108 machined therein, respectively. The shape and cooling configuration of the resulting core is machined directly into the top half and bottom half of the core die tool 100, thus imparting these features into any shape molded within the tool 100.

Figure 2:
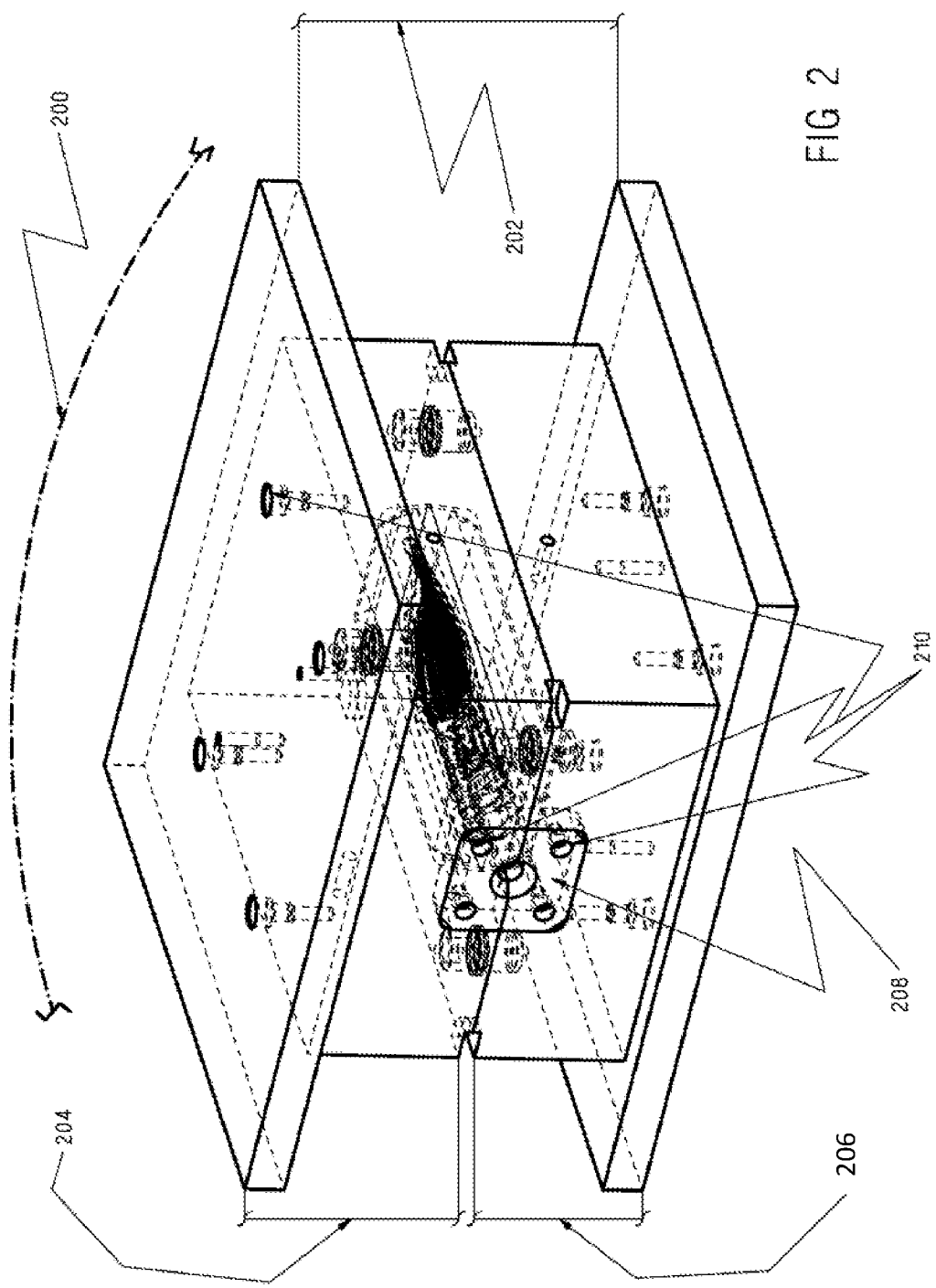
FIG. 2 is a perspective view of a system for producing cores in accordance with an embodiment of the present disclosure.
Figure 3:
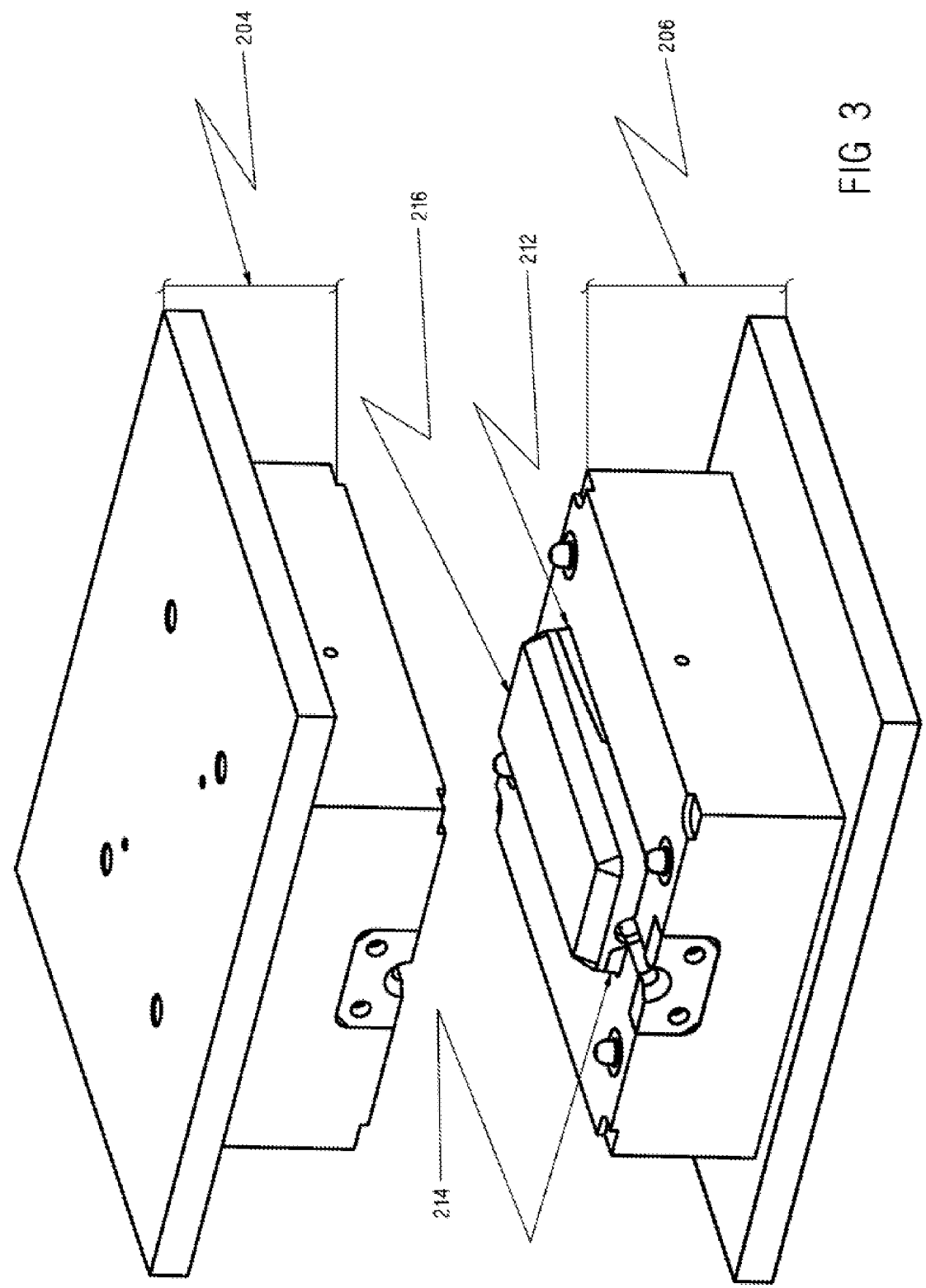
FIG. 3 is an alternate perspective view of the system of FIG. 2 and depicts an upper portion of the cavity block removed, in accordance with an embodiment of the present disclosure.
Figure 4:
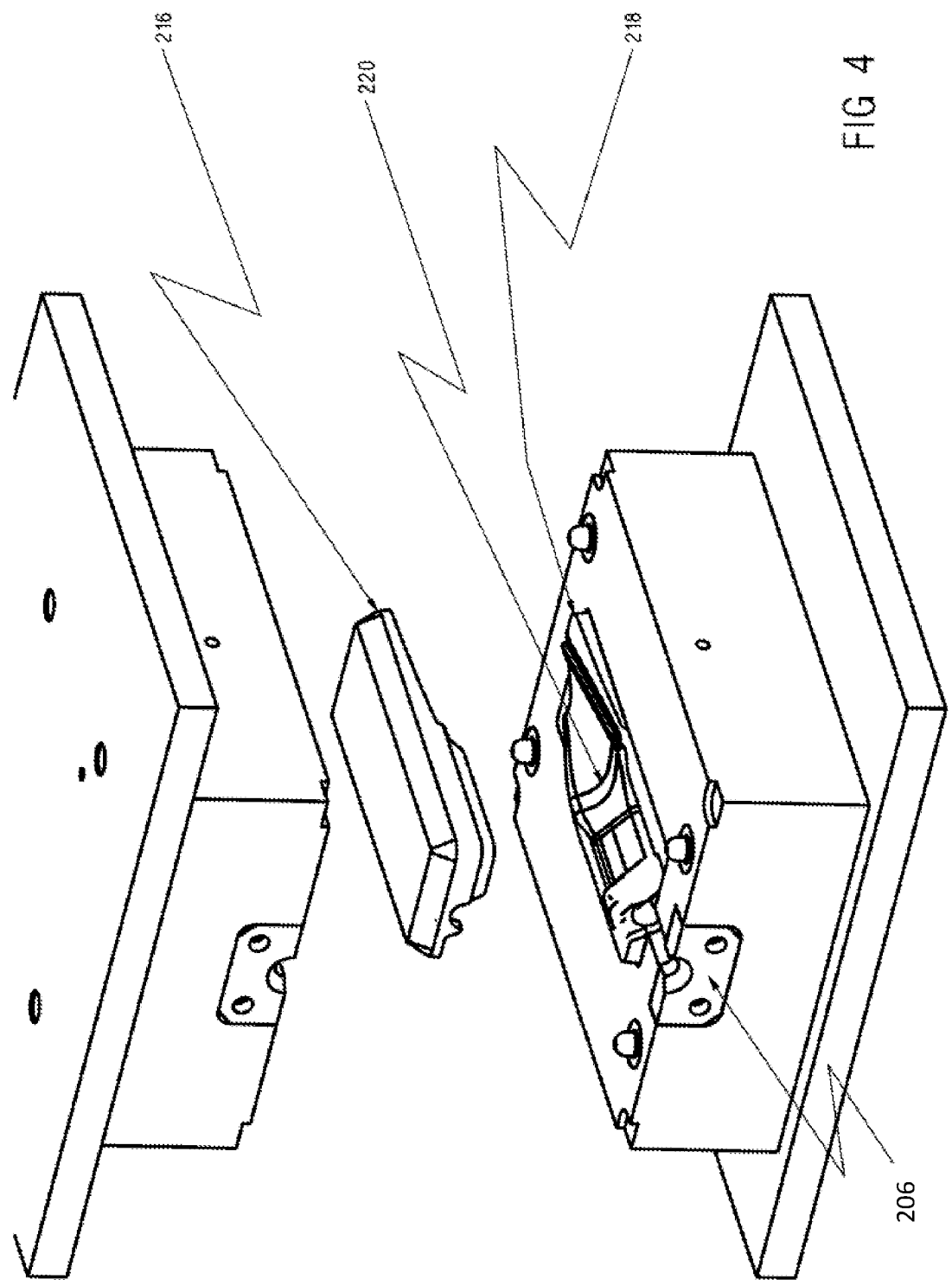
FIG. 4 is an alternate perspective view of FIG. 2 and depicts a portion of an adapter insert removed, in accordance with an embodiment of the present disclosure.
Figure 5:
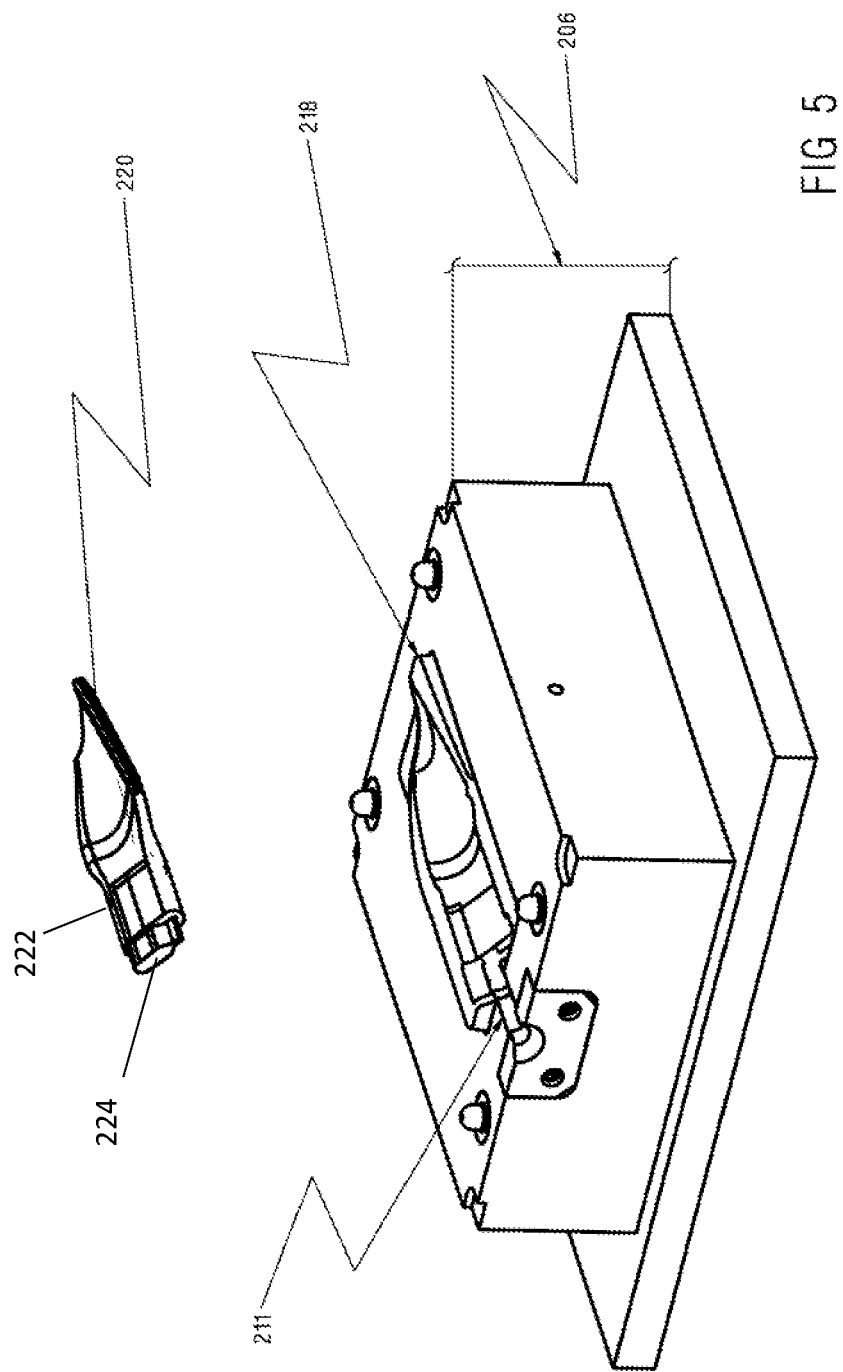
FIG. 5 is an alternate perspective view of FIG. 2 and depicts a core die insert in accordance with an embodiment of the present disclosure.

Referring now to FIGS. 2-8, various embodiments of the present disclosure are shown in more detail. A system 200 for producing a core for use in casting a gas turbine component is shown in FIGS. 2-4. The system 200 comprises a cavity block 202 having an upper portion 204 and a lower portion 206. The upper portion 204 is connected to the lower portion 206 and secured together by a locking mechanism (not shown). The system 200 also includes a feed plate 208 through which a core die material is injected into the system. The feed plate 208 is attached to the system 200 by a plurality of fasteners 210 and can thus be changed if desired while maintaining the other parts of system 200. Referring now to FIG. 5, the feed plate 208 is in communication and aligned with a channel 211, which is in turn in communication with an inlet 224 of a core die insert 220.

Referring now to FIG. 3, the upper portion 204 is removed from the lower portion 206, revealing a recessed cavity 212 in the lower portion 206 and upper portion 204 (not shown). Positioned within the recessed cavity 212 is an adapter insert 214. The adapter insert 214 is sized to fit precisely in the recessed cavity 212 for purposes of supplying the core material and when locked in the cavity block 202, applying the necessary pressure to the core material for it to properly fill the die cavity and solidify. The adapter insert 214 can be machined from standard tool steel or a plastic material. Alternatively, the adapter insert 214 can be produced by an additive manufacturing process.

As depicted in FIGS. 3 and 4, the adapter insert 214 has a first portion 216 and a second portion 218. The adapter insert 214 has profiles in the first portion 216 and second portion 218 corresponding to the shape of a core die insert 220.

Figure 6:
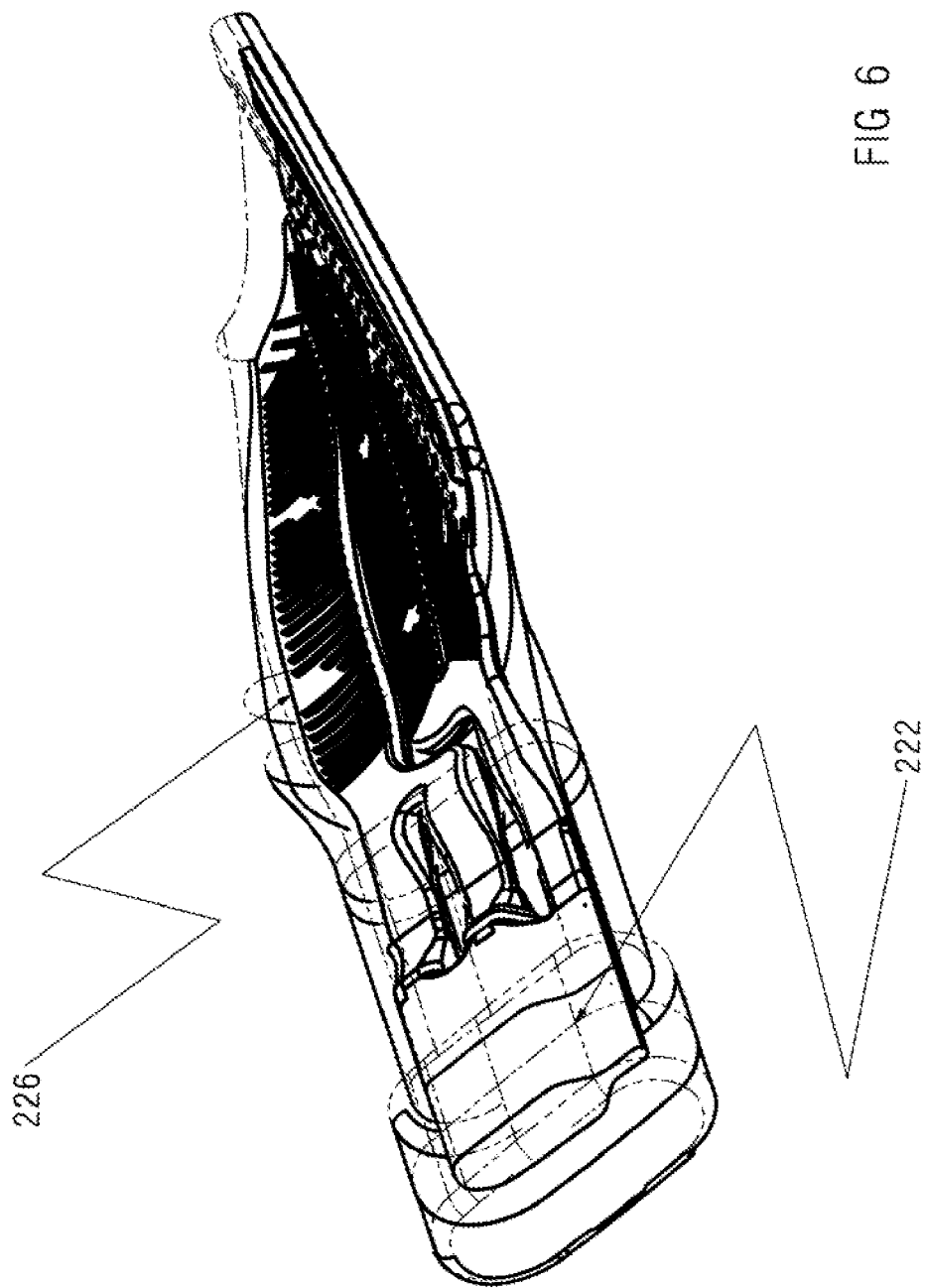
FIG. 6 is an alternate perspective view of FIG. 2 and depicts a core produced as a result of the core die insert, in accordance with the present disclosure.

Contained within the adapter insert 214 is a core die insert 220, as shown in detail in FIGS. 4 and 5. The core die insert 220 has a hollow internal profile corresponding to an external profile of a core for casting a gas turbine component. The core die insert 220 has an external profile 222 as shown in FIG. 6, where the external profile 222 of the core die insert 220 corresponds to the first portion 216 and the second portion 218 of the adapter insert 214.

The core die insert 220 is fabricated from a sacrificial material, such that it can be easily removed from around a finished solidified core, which is formed in the hollow internal portion of the core die insert 220. The core die insert 220 is preferably manufactured from an additive manufacturing process. One such material acceptable for use in producing the core die insert is a 3-D printable polymer material (Halcyon), which is a water-soluble material. The present disclosure is not limited to this material, but instead, includes any 3-D printable material that is water-soluble and does not interact with the ceramic-based core material.

Figure 7:
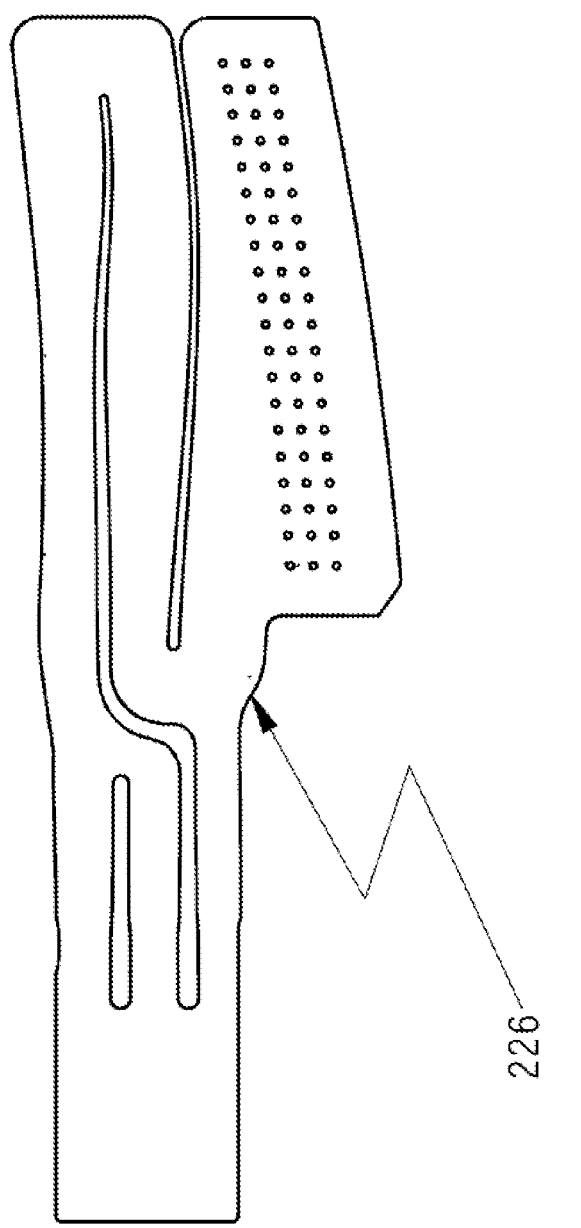
FIG. 7 is an alternate perspective view of the core of FIG. 6 produced by the core die insert, in accordance with an embodiment of the present disclosure.

Since the core die insert 220 is manufactured through an additive manufacturing process, it can be formed in multiple pieces, or as a single piece, with a hollow interior in the shape and profile of the core. As one skilled in the art of investment casting will understand, the traditional core die tool is designed to open and with a number of pull planes, or ways in which the core die tool comes apart, so that the core can be removed. Multiple pulls may be necessary depending on the complexity of the core geometry. By producing a core die insert 220 through an additive manufacturing process, the core does not have to be removed from the core die insert 220 and it is possible to produce a hollow profile which cannot be produced through traditional core tooling. The core 226 produced as a result of the present disclosure, and depicted in FIGS. 6 and 7, is equally usable in a casting process, as cores produced via traditional tooling.

Referring now to FIG. 8, a method 300 of producing a core for casting a gas turbine component is provided. The method 300 comprises a step 302 of providing a core injection tooling comprising a cavity block, an adapter insert, and a core die insert. In a step 304, a ceramic-based core material is supplied into the core die insert. The process of supplying the core material can take on a variety of techniques such as injection, vacuum, pouring, or other material fluid flow technique. Then, in a step 306, pressure is applied to the core die insert through the adapter insert and cavity block, and in a step 308, the ceramic-based core material fills and solidifies within the core die insert. In a step 310, the core die insert is removed from around the ceramic-based core material by way of placing the resulting core and core die insert in a water-based bath/solution.

Numerous advantages are provided by the present disclosure when compared to traditional core die tools and manufacturing processes. For example, the present disclosure provides a faster way to produce ceramic cores over traditional tooling practices as traditional core tool manufacturing often requires upwards of 20 weeks to produce. In addition, since the core die tooling can be fabricated by an additive manufacturing process and not traditional machining of a block of tool steel, more complex geometries can be formed in the core tool die. Furthermore, by fabricating the core die tool from a sacrificial material, such as a water-soluble material, it is easier to remove the tool from around the solidified core.

Although a preferred embodiment of this disclosure has been disclosed, one of ordinary skill in this art would recognize that certain modifications would come within the scope of this disclosure. For example, while the present disclosure has particular application in the aerospace industry for smaller complex blades and vanes, the core production process outlined herein is also applicable to larger turbine blades and vanes, such as those used in industrial gas turbine components. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Having thus described the disclosure, what is claimed is:

1. A method of producing a core for a gas turbine component casting comprising:
    using a core injection tooling comprising a cavity block having an upper portion, a lower portion, a locking mechanism configured to secure the upper portion and the lower portion together, and a recessed cavity in each of the upper portion and the lower portion, an adapter insert having a first portion and a second portion, the first portion and the second portion being selectively separable, the adapter insert sized to fit within the recessed cavities in the cavity block, and a core die insert separate from and positioned within the adapter insert, the core die insert including a sacrificial material;
    directing a ceramic-based core material into the core die insert;
    applying pressure to the core die insert through the adapter insert and the cavity block; and
    permitting solidification of the ceramic-based core material within the core die insert.

2. The method of claim 1, wherein the core die insert is fabricated from an additive manufacturing process.

3. The method of claim 2, wherein the core die insert is fabricated in a single piece.

4. The method of claim 1, wherein the adapter insert is fabricated from a plastic material.

5. The method of claim 1, wherein the core die insert is water soluble.

6. The method of claim 5, wherein the core can be removed from the core die insert by placing the core die insert together with the solidified ceramic-based core material therein in a water-based bath solution.

7. The method of claim 1, further including manufacturing the core die insert using a printable polymer material.

8. The method of claim 1, wherein the ceramic-based core material is directed into the core die insert via a feed plate of the cavity block that is in communication with a channel adjacent the core die insert.

9. The method of claim 1, wherein the adapter insert includes plastic.

10. The method of claim 1, wherein the core die insert has an internal profile corresponding to an external profile of the core.

11. The method of claim 10, wherein the core die insert has an external profile that corresponds to the adapter insert.

12. The method of claim 1, wherein:
    the first portion is insertable in and removable from the recessed cavity in the upper portion; and
    the second portion is insertable in and removable from the recessed cavity in the lower portion.

13. A method of producing a core for a gas turbine component casting comprising:
    forming a sacrificial core die insert from water-soluble material;
    providing an adapter insert, the adapter insert having a first portion and a second portion, the first portion and the second portion being selectively separable;
    providing a core injection tool including a cavity block having a recessed cavity, the cavity block having an upper portion, a lower portion, a feed plate, and a channel in communication with the feed plate;
    positioning the adapter insert and the core die insert within the cavity block such that the adapter insert is situated within the recessed cavity and the core die insert is situated within the adapter insert;
    directing a ceramic-based core material into the core die insert via the feed plate and through the channel;
    applying pressure to the core die insert through the cavity block and the adapter insert; and
    permitting solidification of the ceramic-based core material within the core die insert;
    wherein, an internal profile of the core die insert corresponds to an external profile of the core for a gas turbine component casting.

14. The method of claim 13, further including placing the feed plate adjacent a split line in the cavity block.

15. The method of claim 13, wherein the adapter insert is fabricated by an additive manufacturing process.

16. The method of claim 13, wherein the core die insert is fabricated by an additive manufacturing process.

17. A method of producing a core for a gas turbine component casting comprising:
    using a core injection tooling including a cavity block having an upper portion, a lower portion, a locking mechanism configured to secure the upper portion and the lower portion together, and a recessed cavity in each of the upper portion and the lower portion;

using an adapter insert sized to fit within the recessed cavities, the adapter insert having a first portion and a second portion, the first portion and the second portion being selectively separable;

using an additive manufacturing process to fabricate a core die insert comprising sacrificial material;

situating the adapter insert within the recessed cavities and the core die insert within the adapter insert;

directing a ceramic-based core material into the core die insert;

applying pressure to the core die insert through the adapter insert and the cavity block;

permitting solidification of the ceramic-based core material within the core die insert; and removing the core from the core die insert.

18. The method of claim 17, wherein the core die insert has an internal chamber corresponding to a shape of the core.

19. The method of claim 18, further comprising fabricating the adapter insert using the additive manufacturing process.

20. The method of claim 17, wherein:
the first portion is insertable in and removable from the recessed cavity in the upper portion; and
the second portion is insertable in and removable from the recessed cavity in the lower portion.

\* \* \* \* \*